(12) United States Patent
McClellan et al.

(10) Patent No.: US 10,484,046 B1
(45) Date of Patent: *Nov. 19, 2019

(54) SYSTEMS AND METHODS FOR A TWISTED PAIR TRANSCEIVER WITH CORRELATION DETECTION

(71) Applicant: Marvell International Ltd., Hamilton (BM)

(72) Inventors: Brett McClellan, Laguna Hills, CA (US); Kuoruey Han, Irvine, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 16/002,584

(22) Filed: Jun. 7, 2018

Related U.S. Application Data

(63) Continuation of application No. 15/434,947, filed on Feb. 16, 2017, now Pat. No. 10,009,062, which is a continuation of application No. 14/877,504, filed on Oct. 7, 2015, now Pat. No. 9,577,708.

(60) Provisional application No. 62/066,511, filed on Oct. 21, 2014.

(51) Int. Cl.
*H04B 3/00* (2006.01)
*H04L 25/00* (2006.01)
*H04B 3/46* (2015.01)
*H04B 1/40* (2015.01)
*H04L 12/931* (2013.01)

(52) U.S. Cl.
CPC .............. *H04B 3/46* (2013.01); *H04B 1/40* (2013.01); *H04L 49/351* (2013.01)

(58) Field of Classification Search
CPC ............ H04B 3/46; H04B 1/40; H04L 49/351; H04L 41/083; H04L 7/0008
USPC ................. 375/257, 258, 219, 220, 222, 354
See application file for complete search history.

(56) References Cited

U.S. PATENT DOCUMENTS

| 7,469,023 | B2 | 12/2008 | Vasana |
| 9,294,355 | B2 * | 3/2016 | Edwards ............... H04L 41/083 |
| 10,009,062 | B1 * | 6/2018 | McClellan ............... H04B 3/46 |
| 2003/0095616 | A1 * | 5/2003 | Castellano ............ H04L 7/0008 375/354 |
| 2005/0058149 | A1 | 3/2005 | Howe |

OTHER PUBLICATIONS

Lo, "Auto-Negotiation Status Update," IEEE 802.3bp RTPGE, Plenary Meeting, Jul. 2014, 15 pages.

(Continued)

*Primary Examiner* — Phuong Phu

(57) ABSTRACT

The systems and methods for a twisted pair transceiver with correlation detection includes a transceiver system operating on a cable. The transceiver system includes a receiver to obtain one or more data samples related to one or more encoded data symbols. The transceiver system further includes a first correlation filter to generate a first correlation output based on the one or more data samples, and a second correlation filter to generate a second correlation output based on the one or more data samples. The transceiver system further includes a detector. The detector compares the first correlation output with the second correlation output, generates an output data bit based on a comparison result, and sends the output data bit for data decoding.

18 Claims, 3 Drawing Sheets

(56) References Cited

OTHER PUBLICATIONS

Lo, "Fast Synchronization Mechanism for 1000BASE-T1," IEEE 802.3bp RTPGE, Plenary Meeting, Mar. 2014, 17 pages.
Lo, "Modified Clause 73 Auto-Negotiation Detailed Proposal," IEEE 802.3bp RTPGE, Plenary Meeting, Mar. 2014, 23 pages.

* cited by examiner

SYSTEMS AND METHODS FOR A TWISTED PAIR TRANSCEIVER WITH CORRELATION DETECTION

CROSS-REFERENCE TO RELATED APPLICATION

This disclosure is a continuation of U.S. patent application Ser. No. 15/434,947, filed Feb. 16, 2017 (now allowed), which is a continuation of U.S. patent application Ser. No. 14/877,504, filed Oct. 7, 2015, now U.S. Pat. No. 9,577,708, which in turn claims the benefit of U.S. Provisional Patent Application No. 62/066,511, filed Oct. 21, 2014. The aforementioned applications are hereby incorporated by reference herein in their entireties.

FIELD OF USE

This disclosure relates to a physical transceiver that operates on a single twisted wire pair cable in a data transmission system; for example, a local area network (LAN) implementing the IEEE 802.3 (Ethernet) standard.

BACKGROUND OF THE DISCLOSURE

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

Physical transceivers that operate on a single twisted wire pair cable is a new application of LANs in the IEEE 802.3 (Ethernet) standard. The single pair cable conveys signals from one transceiver to another via a dual duplex channel. The IEEE 802.3 (Ethernet) Working Group has two active task forces in this area addressing 1 Gigabit and 100 Megabits over a single twisted pair cable, i.e., 1000BASE-T1 and 100BASE-T1. As a transceiver can operate at multiple rates, two devices connected by a cable can negotiate a commonly supported rate for both devices to operate on.

Transceiver performance in a single twisted pair application can be impaired by multiple sources of degradation. First the single twisted pair may be used to convey a voltage across the differential pairs along the length of the cable, e.g., the power over differential line (PoDL). The PoDL system requires a scheme to block the direct current (DC) voltage source from the transceiver. PoDL can also introduce significant noise at low frequencies into the transmission system that can degrade transceiver performance. A high pass network or isolation device such as capacitors or a magnetic transformer can be used to isolate the transceiver from the DC voltage supplied to the differential wire pair. The isolation device may attenuate low frequency signals between the transceiver and the differential wire pair. An example can be a first order high pass filter (HPF) at the cutoff frequency of 10 MHz. In a system using PoDL with the 10 MHz HPF, the communication channel is no longer suitable to implement typical baseband line codes such as Non-Return to Zero (NRZ) or IEEE 802.3 Clause 73 differential Manchester encoding (DME) with a conventional receiver architecture, because significant low frequency energy can be lost. Data recovery can thus be difficult and system bit error performance is degraded.

Second, the system can be impaired by multiple broadband noise sources such as thermal noise, which is typically modelled as additive white Gaussian noise (AWGN).

Third, the system can be impaired by radio frequency narrow band interferers (NBI), which can couple onto the twisted pair and appear as an undesired signal at the receiver in addition to the desired signal and AWGN. The NBI is typically modeled as a sine wave. The levels of NBI in the single twisted pair transceiver application can be significant, relative to the transmit signal of the transceiver. For example, a NBI signal of 200 mV can occur to a 1V nominal transmit level.

Fourth, the twisted pair cable itself may attenuate higher frequencies and distort the transmitted signal introducing inter-symbol interference (ISI) at the receiving transceiver.

SUMMARY

The systems and methods for a twisted pair transceiver with correlation detection include a method for pre-processing signals at a transceiver. The method includes obtaining one or more data samples related to one or more encoded data symbols. The method further includes generating, via a first correlation filter, a first correlation output based on the one or more data samples, and generating, via a second correlation filter, a second correlation output based on the one or more data samples. The method further includes comparing the first correlation output with the second correlation output. The method further includes generating an output data bit based on a comparison result, and sending the output data bit for data decoding.

In some implementations, the one or more data samples are received from a single twisted pair cable at the single twisted pair transceiver.

In some implementations, the one or more encoded data symbols include differential Manchester encoded symbols.

In some implementations, each of the one or more encoded data symbols includes a symbol period that has a clock transition spacing period and a data transition spacing period.

In some implementations, the first correlation filter or the second correlation filter has a number of coefficients that match a total number of the one or more data samples.

In some implementations, the first correlation filter has a first set of coefficients that are pre-defined to evaluate whether the one or more data samples corresponds to an input data bit of 0.

In some implementations, the second correlation filter has a second set of coefficients that are pre-defined to evaluate whether the one or more data samples correspond to an input data bit of 1.

In some implementations, the comparing includes comparing a first absolute value of the first correlation output with a second absolute value of the second correlation output. The output data bit is determined to be 1 if the second absolute value of the second correlation output is greater than the first absolute value of the first correlation output. Or the output data bit is determined to be 0 if the second absolute value of the second correlation output is no greater than the first absolute value of the first correlation output.

In some implementations, the comparing is performed at a dual set of filters for both positive and negative polarities of a first value of the first correlation output and a second value of the second correlation output.

In some implementations, the one or more encoded data symbols are transmitted at a baud rate that is compatible with two or more transmission formats.

Some embodiments described herein include a transceiver system operating on a cable. The transceiver system includes a receiver to obtain one or more data samples related to one or more encoded data symbols. The transceiver system further includes a first correlation filter to generate a first correlation output based on the one or more data samples, and a second correlation filter to generate a second correlation output based on the one or more data samples. The transceiver system further includes a detector. The detector compares the first correlation output with the second correlation output, generates an output data bit based on a comparison result, and sends the output data bit for data decoding.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which.

DETAILED DESCRIPTION

This disclosure describes methods and systems for a physical transceiver that operates on a single twisted wire pair cable in a data transmission system; for example, a LAN implementing the IEEE 802.3 (Ethernet) standard. According to this disclosure, data samples obtained at a transceiver can be processed with a correlation detector before being decoded at a decoder. In this way, the effects from channel noise and/or inter-symbol interference (ISI) may be reduced and thus data performance can be improved.

Figure 1:
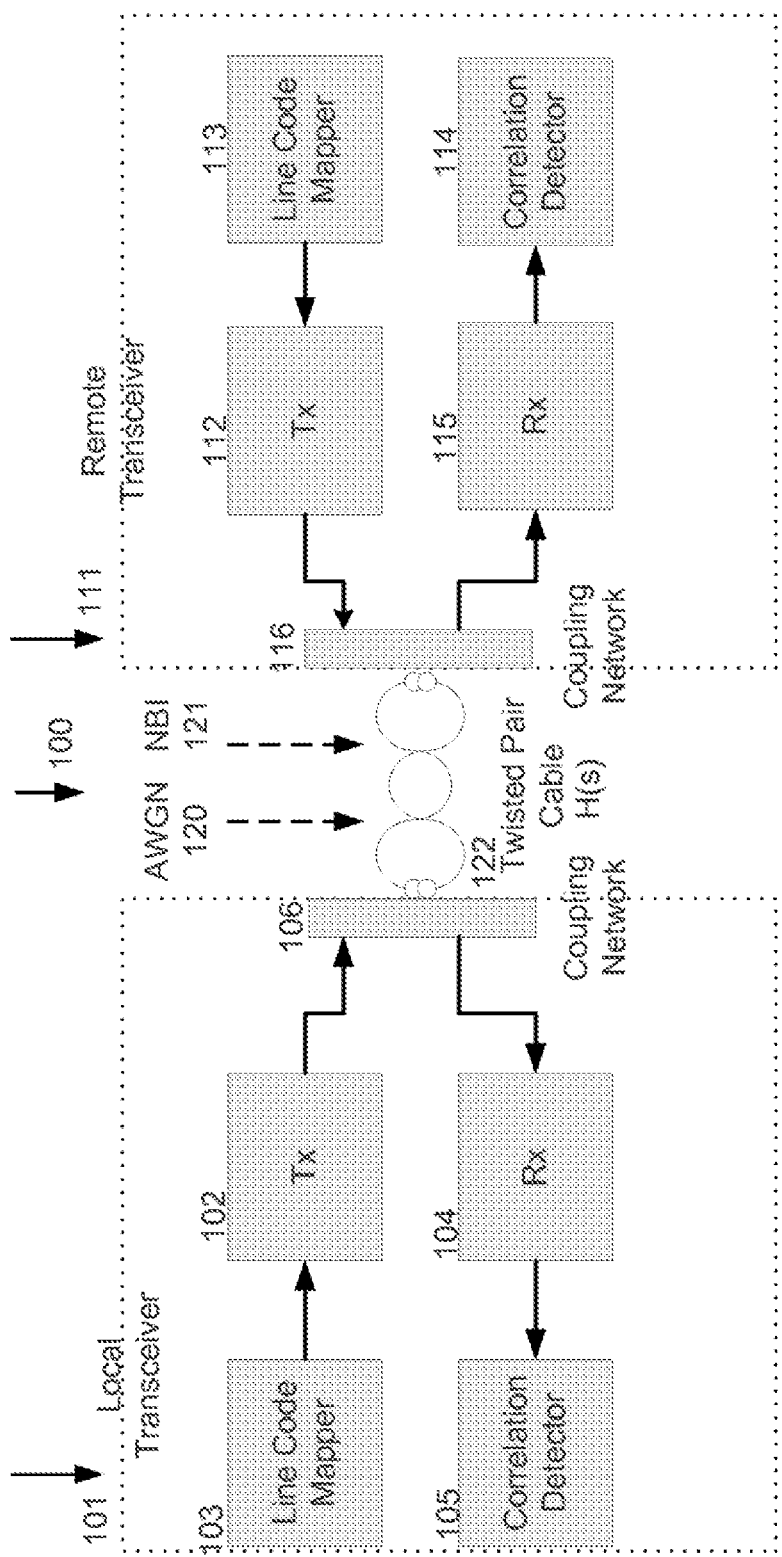
FIG. 1 provides a block diagram illustrating a communication system 100 including physical transceivers that operate on a single twisted wire pair cable, in accordance with embodiments of this disclosure.

FIG. 1 provides a block diagram illustrating a communication system 100 that includes physical transceivers that operate on a single twisted wire pair cable. A communication device A 101 can send and/or receive data bits to a communication device B 111 via a communication channel, e.g., a single twisted wire pair cable 122. Each of the devices 101 and 111 is a physical layer transceiver to send or receive signals from the cable 122.

When device A 101 sends a data packet to device B 111, the data packet may be encoded by a line code mapper 103, and then processed at transmit processing block 102 to do waveform shaping and spectrum control tasks such as digital filtering, digital to analog conversion (DAC), analog filtering, and/or the like. In this example, the differential Manchester encoding (DME) can be employed by the line code mapper 103, which is a type of line code specified in IEEE 802.3 clause 73 used to convey data across the link.

The coupling network 106 will provide interface for transmitting at transmitter 102, and receiving at receiver 104 to single twisted pair cable 122. Device B 111, as a receiver of the data, may correspondingly include a coupling network 116 to interface with a receiver processing block 115, and a transmitter processing block 112. The transmitter processing block 112 is connected to a line code mapper 113, which is similar to 103 in device A 101. The receiver processing block 115 is connected to a correlation detector block 114 to process the received data from cable 122. The receiver block 115 may perform analog anti-alias filtering, and analog to digital conversion (ADC), and/or the like. Various factors can affect the decoding performance of the communication system 100. For example, the channel cable 122 may be affected by additive white Gaussian noise 120 (AWGN), radio frequency narrow band interferences 121 (NBI), and/or the like. The data transmission may also be affected by intersymbol interference (ISI) which may be characterized by a transfer function H(s) 122.

An example DME receiver (e.g., the physical transceiver 111) may rely on a baseband response of the communications channel 122 and sufficient bandwidth that a Non-Return to Zero (NRZ) two-level detector may be used to detect and decode the DME symbols. The DME receiver may compare the signal level in the middle of the clock transition spacing period to the signal level in the middle of the data transition spacing period. If the levels are different, then a data transition has occurred indicating that the data bit is 1.

In a system using power over differential line (PoDL) with 10 MHz HPF, the channel H(s) 122 is no longer baseband and such DME receiver may not reliably decode the data. A correlation detector 105 or 114 can be employed to improve data performance. The correlation detector 105 or 114 can process the received data signals from the cable channel 122, and generate the optimal output data bit estimate. The correlation detector 105 correlates multiple data samples of one or more DME symbols to reduce negative effects of channel noise and interferences, e.g., AWGN 120, NBI 121, ISI, as further illustrated in FIGS. 4-5.

Figure 2:
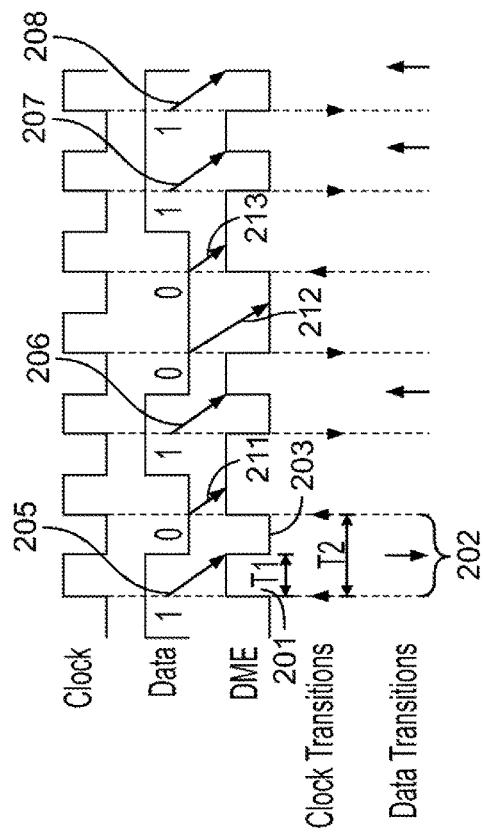
FIG. 2 provides an example diagram illustrating differential Manchester encoding (DME) used in the IEEE 802.3 Ethernet standard, in accordance with embodiments of this disclosure.

FIG. 2 provides an example diagram illustrating differential Manchester encoding (DME) used in the IEEE 802.3 Ethernet standard. DME is a type of line code specified in IEEE 802.3 clause 73 used to convey data across the link, which can be implemented at the line code mapper 103 in FIG. 1.

The DME code may start with a clock transition spacing period 201 with a length of T1, which can be 30 nanoseconds long. Each DME symbol period 202 having a length of T2=60 nanoseconds consists of a clock transition spacing period (with a length of T1=30 nanoseconds) followed by a bit transition spacing period 203 (with a length of T1=30 nanoseconds).

The clock transition spacing period 201 begins when the transmitter (e.g., see the device A 101 in FIG. 1) changes to the opposite of the prior state, causing a high-to-low or low-to-high transition on the transmitted signal (e.g., the DME code). For example, after the first clock transition spacing period, if the data bit to be transmitted is "1" at 205, the transmitter may change to the opposite of the prior state, causing a high-to-low or low-to-high transition on the transmitted signal, e.g., see 205-208. If the data bit to be transmitted is "0," there is no change in the transmit signal, e.g., see 211-213. After a spacing period of T1, the next clock transition is sent.

Alternative implementations of DME can include using a data transition on the transmitted signal when the data bit is "0" and no transition when the data bit is "1."

Figure 3:
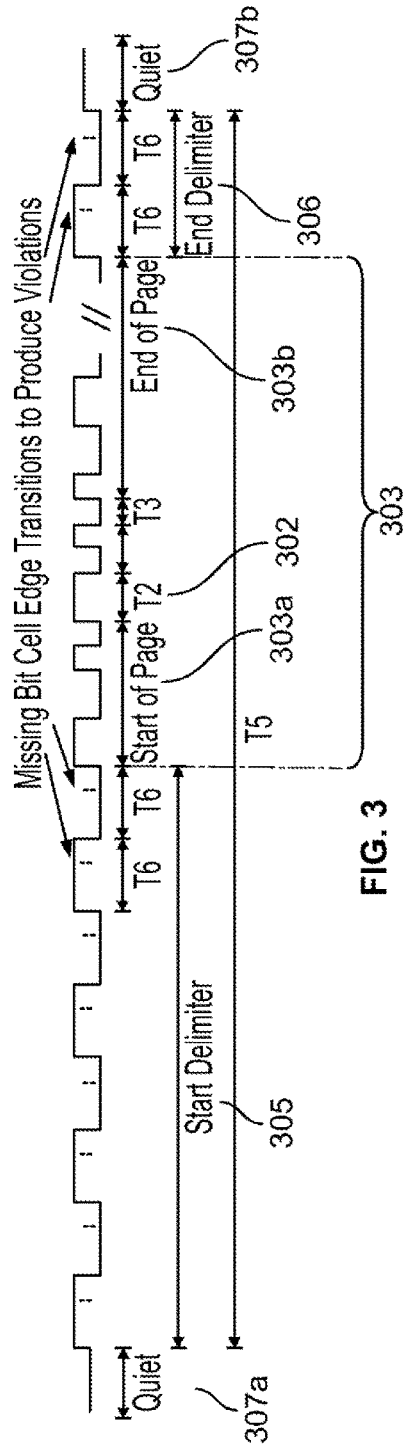
FIG. 3 provides an example diagram illustrating aspects of a half-duplex auto-negotiation scheme for a single twisted pair transceiver application, in accordance with embodiments of this disclosure.

FIG. 3 provides an example diagram illustrating aspects of a half-duplex auto-negotiation scheme for a single twisted pair transceiver application. Further discussion on the auto-negotiation scheme can be found in commonly-owned, co-pending U.S. patent application Ser. No. 13/350,969, which is hereby expressly incorporated by reference in its entirety.

The negotiation protocol and state machine defined in 802.3 Clause 73 can be implemented on baseband Non-Return-to-Zero (NRZ) serial links. The serial links use separate transmit and receive paths in a half-duplex negotiation scheme for dual-duplex transceivers. As shown in FIG. 3, the DME symbol period 302 is indicated by T2. Each symbol period contains two half-symbols representing data and clock, respectively, and may be transmitted as a combination of high/high, high/low, low/high or low/low depending upon the prior symbol and the current data bit. For example, a transition in the middle of the symbol indicates the data bit is 1, as illustrated in the example at FIG. 2.

The link code word can include a set of data bits contained within an overall auto-negotiation page 303. The start of the page 303*a* can immediately follow a start delimiter 305, which is inserted to mark the start of the page followed by DME coded data. The auto-negotiation page 303 ends with an end delimiter 306 to mark the end of the page 303*b*.

In the example shown at FIG. 3, an auto-negotiation page carries a 48-bit link code word. The page can consist of 158 (e.g., 24+128+6) evenly spaced transition positions that contain a starting Manchester violation delimiter, the 48-bit link code word, a 16-bit cyclic redundancy check (CRC), and an ending Manchester violation delimiter. Odd-numbered transition positions represent clock information, and even-numbered transition positions represent data information. The page is alternately transmitted between the two devices with quiet periods 307*a-b* separating the pages.

For example, the first 24 transition positions can contain the starting Manchester violation delimiter, which marks the beginning of the page. The starting Manchester violation contains a transition from quiet to active at position 1, followed by transitions at positions 4, 7, 10, 13, 16, 19, and 22, and no transitions at the remaining positions.

The last six transition positions contain the ending Manchester violation delimiter, which marks the end of the page. The ending Manchester violation contains transitions at positions 153 and 156 and no transitions at the remaining positions. Position 159 contains a transition from active to quiet. The starting and ending Manchester violation delimiter may be the only place where three intervals occur between transitions. This allows the receiver to obtain page synchronization.

One issue to consider when defining an auto-negotiation mechanism is that the transmit signaling and receiver implementation should not add unnecessary complexity to the lower speed device. In this case, the 100BASE-T1 operates at a rate of 66⅔ million baud (Mbaud) with a transmitter and receiver operating at bandwidths around 33⅓ MHz. A 1000BASE-T1 operates at a rate of 750 Mbaud with a transmitter and receiver operating at bandwidths around 375 MHz.

To avoid hardware overhead, an auto-negotiation between a device that supports only 100BASE-T1 and a device that supports 1000BASE-T1 and 100BASE-T1 should not require the 100BASE-T1 device to operate at bandwidths higher than 33⅓ MHz or baud rates higher than 66⅔ Mbaud.

Similarly, the auto-negotiation scheme should be compatible with the transmitters designed for 100BASE-T1. To avoid electromagnetic radiation compliance issues, the auto-negotiation signaling should comply with the transmit power spectral density for 100BASE-T1.

The selection of auto-negotiation signaling should also be compatible with a transmitter and/or a receiver designed for 1000BASE-T1 operation. A device that supports only 1000BASE-T1 should not require added complexity to transmit and receive the auto-negotiation signaling.

The compatibility and complexity issue may be addressed by selecting a DME baud rate that is compatible with the baud rates of both 100BASE-T1 (66⅔Mbaud) and 1000BASE-T1 (750 Mbaud). Selecting a baud rate that is a common factor of 66⅔Mbaud and 750 Mbaud allows both types of devices to transmit and receive DME symbols with little or no added complexity required.

For example, when a baud rate of 16⅔ Mbaud is selected, the baud rate is equal to ¼ of the 66⅔ Mbaud rate for 100BASE-T1 and ¼₅ of the 750 Mbaud rate for 1000BASE-T1. A 100BASE-T1 device can transmit the DME symbol using four samples at 66⅔ Mbaud. A 1000BASE-T1 device can transmit the DME symbol using 45 samples at 750 Mbaud. Other common factors may be selected to define the baud rate. However, selecting a common factor at baud rates lower than 16⅔ Mbaud may degrade the performance of DME detection in a system using PoDL with 10 MHz HPF.

In the above example, implementing a 1000BASE-T1 device may use analog or digital filtering to shape the transmit signal, e.g. Tx block 102 in device 101. The signal may be shaped to conform to 100BASE-T1 transmitter specifications or to filter out frequencies beyond the DME signaling bandwidth.

Figure 4:
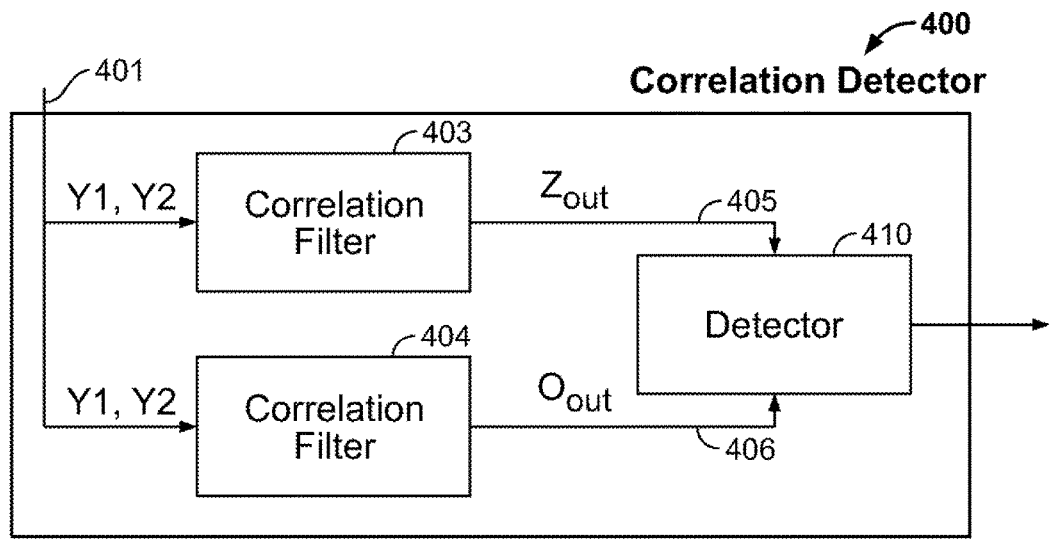
FIG. 4 provides an example block diagram illustrating example structures of a correlation detector 400 (e.g., similar to 105, 114 at FIG. 1) at the physical transceiver (e.g., 104, 113 at FIG. 1) to improve transmission performance, in accordance with embodiments of this disclosure.

FIG. 4 provides an example block diagram illustrating example structures of a correlation detector 400 (e.g., similar to 105, 115 at FIG. 1) at the physical transceiver (e.g., 101, 111 at FIG. 1) to improve transmission performance.

The physical transceiver (e.g., 101, 111 at FIG. 1) can employ a correlation detector 400 that operates on two or more samples 401-402 per DME symbol, and operates on one or more DME symbols per bit decision. For example, when there are two equally spaced samples per symbol, e.g., one during the clock transition spacing period and one during data transition spacing period, the two samples 401 are processed by two two-tap correlation filters 403-404 with coefficients selected to match the response of the DME symbol for cases when the data bit is 0 or 1. These coefficients respectively are $[z_1, z_2]$ and $[o_1, o_2]$. As an example, the coefficients may be selected from the set [+1, 0, −1], but are not limited to these choices.

Consider an example DME symbol where the data bit=1 and the prior signal level was +1. The DME symbol begins with a clock transition period having a high-to-low transition, e.g., +1 to −1, followed by a data transition period low to high, e.g., −1 to +1. If the two received samples for this DME symbol are $y_1$ and $y_2$, the correlation filter outputs 405-406 can be represented as $z_{out}=z_1 \times y_1 + z_2 \times y_2$ and $o_{out}=o_1 \times y_1 + o_2 \times y_2$. The coefficients may be set to $z_1=+1$, $z_2=+1$, $o_1=-1$, $o_2=+1$.

A detector 410 then compares the absolute values of $z_{out}$ 405 and $o_{out}$ 406. If the absolute value of $o_{out}$ is greater than the absolute value of $z_{out}$, then the data bit is decided to be a "1." Otherwise, the data bit is decided to be a "0." For example, if the received samples $y_1=-0.5$, $y_2=+0.5$, $z_{out}=0$, $o_{out}=1$. The detector output is 1, e.g., the data bit is decided to be "1."

Consider a case when the transmitted data bit is a "0." The DME symbol may begin with a clock transition period high to low, e.g., +1 to −1, followed by a data transition period (with no transition), e.g., −1 to −1. For received samples $y_1=-0.5$, $y_2=-0.5$, $z_{out}=-1$, $o_{out}=0$. The detector output is determined to be 0, e.g., the data bit is decided to be "0."

The correlation detector may be expanded to process multiple samples (e.g., a number N greater than 2) per DME symbol. For example, if N=5, the coefficients may be set to $z=[+1, +1, +1, +1, +1]$ and $o=[-1, -1, 0, +1, +1]$. A "0" coefficient is used where a transition occurs within the symbol. Similarly, the detector compares the absolute values of $z_{out}$ and $o_{out}$. If the absolute value of $o_{out}$ is greater than the absolute value of $z_{out}$, then the data bit is decided to be a "1." For example, when the transmitted data bit is a 1, and the received 5 samples are $y=[-0.4, -0.6, 0, 0.4, 0.6]$, then $z_{out}=0$, $z_{out}=2$. The detector output is 1. In another example, when the transmitted data bit is a 0, and the received data samples are $y=[-0.4, -0.6, -0.8, -0.6, -0.4]$, then $z_{out}=-2.8$, $o_{out}=0$. The detector output is 0.

In one implementation, for the DME system with baud rate of 16⅔ Mbaud, a 1000BASE-T1 device may be designed to sample the DME symbols at the rate of 750 MHz resulting 45 samples per DME symbol. The device may also be designed to sample the DME symbols at a sampling rate of 750 MHz divided by a factor of N greater than 1, such as 750/15, 750/9, or 750/5 MHz, and/or the like.

When the sampling rate is 750 MHz (or 750/15, 750/9, or 750/5 MHz discussed above), the correlation filter may use 45 received samples and the respective 45 coefficients per symbol, or a decimated number of samples and coefficients per symbol selected from a factor of 45, such as 15, 9, or 5.

Detector performance may be improved by expanding the correlation filter to process more than one DME symbol. The correlation detector may process 1 and ½ DME symbols. For the case N=6, then z and o have 9 coefficients according to the 9 samples for the 1½ DME symbols. The coefficients may be set to $z=[+1, +1, +1, +1, +1, +1, -1, -1, -1]$ and $o=[-1, -1, -1, +1, +1, +1, -1, -1, -1]$. In this example there are two DME symbols where the data bits =1, followed by 0 and the prior signal level was +1. The first DME symbol begins with a clock transition period from +1 to −1, followed by a data transition period from −1 to +1. The second DME symbol begins with a clock transition period +1 to −1, followed by a data transition period (with no transition) −1 to −1. For the first symbol detection the first 9 samples are used. If $y=[-0.4, -0.5, -0.6, 0.4, 0.5, 0.6, -0.4, -0.5, -0.6]$, then $z_{out}=-1.5$, $o_{out}=4.5$. Thus the detector output is 1.

In another example, if there are two DME symbols where the data bits =0, followed by 1, and the prior signal level was +1, the first DME symbol begins with a clock transition period +1 to −1 followed by a data transition period (with no transition) −1 to −1. The second DME symbol begins with a clock transition period −1 to +1, followed by a data transition period +1 to −1. If $y=[-0.4, -0.5, -0.6, -0.7, -0.8, -0.9, +0.4, +0.5, +0.6]$, then $z_{out}=-5.4$, $o_{out}=-2.4$. The detector output is thus 0.

The detector performance may be further improved by selecting correlation filters designed to improve performance in the presence of noise or narrowband interference. For example, a correlation detector that processes 1 and ½ DME symbols and N=45 samples per symbol can be constructed to counter narrow band interference.

In this example the correlation detector processes 1 and ½ DME symbols and N=45 samples per symbol. The following coefficients can be defined as:

P=22 coefficients of +1, e.g. [+1, +1, . . . , +1, +1]
M=22 coefficients of −1, e.g. [−1, −1, . . . , −1, −1]
Z=22 coefficients of 0, e.g. [0, 0, . . . , 0, 0]

Then the coefficients may be set to $z_{PPM}=[P, 1, P, M]$ for a total of 22+1+22+22=67 coefficients, indicating the bit is a 0; and $o_{ZPM}=[Z, 0, P, M]$ for a total of 22+1+22+22=67 coefficients, indicating the bit is a 1.

In this example, assuming that there are two DME symbols where the data bits =1, followed by 0 and the prior signal level was +1. Thus the first DME symbol begins with a clock transition period +1 to −1, followed by a data transition period −1 to +1. The second DME symbol begins with a clock transition period +1 to −1, followed by a data transition period (with no transition) −1 to −1. For the first symbol detection, the first 67 samples are used, e.g., $y=[M, 0, P, M]$ for a total of 22+1+22+22=67 samples. Then $z_{out}=z_{PPM} \times y=22$, $o_{out}=o_{ZPM} \times y=44$, where 'x' stands for vector inner product of two vectors. The detector then checks for the larger of the absolute value of the two correlation outputs, e.g., in this case $|o_{out}|>|z_{out}|$ and the detector output is 1, where |·| stands for absolute operator.

In the same example, assuming two DME symbols but the data bits =0, followed by 1, and the prior signal level was +1. The first DME symbol begins with a clock transition period +1 to −1 followed by a data transition period (with no transition) −1 to −1. The second DME symbol begins with a clock transition period −1 to +1, followed by a data transition period +1 to −1. Consider $y=[M, -1, M, P]$ for a total of 22+1+22+22=67 samples, then $z_{out}=z_{PPM} \times y=-67$, $o_{out}=o_{ZPM} \times y=-44$. Then in this case $|z_{out}|>|o_{out}|$, and the detector output is 0.

The DME correlation detector may be further combined with a signal energy detect scheme. The DME correlation detector may be held in a disabled or low power state, until the link partner begins transmitting and triggering the receiver energy-detect unit to enable the DME correlation detector. In this way, power overhead of implementing the DME correlation detector at a transceiver can be reduced.

Figure 5:
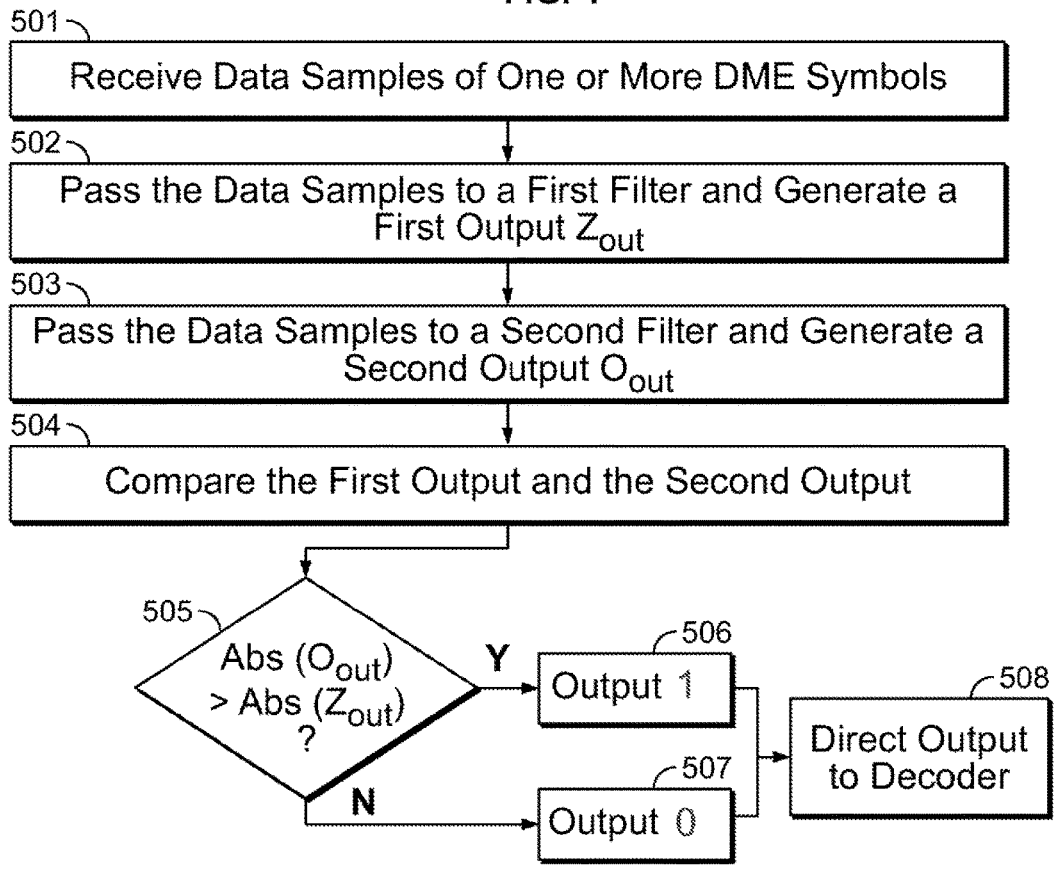
FIG. 5 provides an example logic flow diagram illustrating aspects of a physical transceiver operating a correlation detector to make a bit decision, in accordance with embodiments of this disclosure.

FIG. 5 provides an example logic flow diagram illustrating aspects of a physical transceiver operating a correlation detector to make a bit decision. At 501, the physical transceiver may receive data samples of one or more DME symbols. For example, as discussed in connection with FIG. 4, a correlation detector at the physical transceiver may process a number N data samples of a DME symbols, or multiple DME symbols. The data samples may then be passed on to a first correlation filter at 502, which may be used to evaluate whether the data bit is 0. For example, the first correlation filter may generate a first output, e.g., $z_{out}$ 405 in FIG. 4. At 503, the correlation detector may pass the data samples to a second filter and generate a second output that may evaluate whether the data bit is 1. For example, the second correlation filter output may be similar to $o_{out}$ 406 in FIG. 4. It is noted that steps 502 and 503 may be performed in parallel, or in any sequential order. The correlation detector may then compare the first output and the second output at 504. If the absolute value of the second output is greater than the absolute value of the first output, the detector may output a 1 at 506. Otherwise, the detector may output a 0 at 507.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The foregoing is merely illustrative of the principles of this disclosure, and various modifications can be made without departing from the scope of the present disclosure. The above-described embodiments of the present disclosure are presented for purposes of illustration and not of limitation, and the present disclosure is limited only by the claims that follow.

What is claimed is:

1. A method for transmitting data on an Ethernet link between a first device compatible with a first Ethernet transmission protocol and a second device compatible with a second Ethernet transmission protocol, the method comprising:
   selecting a third baud rate to be a common factor of both a first baud rate specified in the first Ethernet transmission protocol and a second baud rate specified in the second Ethernet transmission protocol;
   receiving, at the first device and from the second device, one or more encoded data symbols at the third baud rate;
   determining a clock division factor based on the first baud rate and the third baud rate;
   sampling, at the first device, the one or more encoded data symbols using a divided clock signal based on the clock division factor; and
   generating, from the sampling, a number of samples representing at least one data symbol, wherein the number equals a result of the first baud rate divided by the common factor.

2. The method of claim 1, further comprising:
   initiating auto-negotiation signaling between the first device and the second device compatible, for the third baud rate compatible with both the first Ethernet transmission protocol and the second Ethernet transmission protocol.

3. The method of claim 1, wherein the sampling, at the first device, the one or more encoded data symbols using a divided clock signal based on the clock division factor to generate one or more data samples comprises:
   dividing each symbol period compatible with the third baud rate into a data transition period and a clock transition period corresponding to the divided clock signal; and
   generating a first data sample within the data transition period and a second data sample from the one or more data samples within the clock transition period.

4. The method of claim 1, further comprising:
   selecting the clock division factor to be an integer that is greater than one and represents a ratio between the first baud rate and the third baud rate, wherein a frequency of the clock signal is divisible by the integer.

5. The method of claim 4, further comprising:
   dividing the clock signal by the division factor selected from the group consisting of 5, 9 and 15 when the first baud rate is 750 Mbaud.

6. The method of claim 1, further comprising:
   generating a decimated number of samples representing at least one data symbol from the one or more encoded data symbols by sampling the one or more encoded data symbols using the divided clock signal,
     wherein the decimated number equals a result of the first baud rate divided by the common factor and then divided by the division factor.

7. The method of claim 6, further comprising:
   configuring a first correlation filter based on the number of samples, wherein the first correlation filter has a same number of coefficients as the number of samples; and
   evaluating whether the one or more data samples correspond to an input data bit of one based on the first correlation filter.

8. The method of claim 7, further comprising:
   configuring a second correlation filter based on the number of samples, wherein the second correlation filter has the same number of coefficients as the number of samples; and
   evaluating whether the one or more data samples correspond to an input data bit of zero based on the second correlation filter.

9. The method of claim 8, further comprising:
   generating an output data bit based at least in part on a first correlation output from the first correlation filter and a second correlation output from the second correlation filter by comparing a first absolute value of the first correlation output with a second absolute value of the second correlation output;
   determining the output data bit is zero if the second absolute value of the second correlation output is greater than the first absolute value of the first correlation output; and
   determining the output data bit is one if the second absolute value of the second correlation output is no greater than the first absolute value of the first correlation output.

10. A system for transmitting data on an Ethernet link between a first device compatible with a first Ethernet transmission protocol and a second device compatible with a second Ethernet transmission protocol, the system comprising:
    a receiver disposed with the first device compatible with the first Ethernet transmission protocol corresponding to a first baud rate, the receiver configured to:
      select a third baud rate to be a common factor of both the first baud rate specified in the first Ethernet transmission protocol and a second baud rate specified in the second Ethernet transmission protocol;
      receive, at the first device and from the second device, one or more encoded data symbols at the third baud rate;
    sampling circuitry disposed with the first device, the sampling circuitry configured to:
      determine a clock division factor based on the first baud rate and the third baud rate;
      sample, at the first device, the one or more encoded data symbols using a divided clock signal based on the clock division factor; and
      generate a number of samples representing at least one data symbol, wherein the number equals a result of the first baud rate divided by the common factor.

11. The system of claim 10, wherein the receiver is further configured to:
    initiate auto-negotiation signaling between the first device and the second device compatible, for the third baud rate compatible with both the first Ethernet transmission protocol and the second Ethernet transmission protocol.

12. The system of claim 10, wherein the sampling circuitry is further configured to:
    divide each symbol period compatible with the third baud rate into a data transition period and a clock transition period corresponding to the divided clock signal; and
    generate a first data sample within the data transition period and a second data sample from the one or more data samples within the clock transition period.

13. The system of claim 10, wherein the sampling circuitry is further configured to:
    select the clock division factor to be an integer that is greater than one and represents a ratio between the first baud rate and the third baud rate, wherein a frequency of the clock signal is divisible by the integer.

14. The system of claim 13, wherein the sampling circuitry is further configured to:
    divide the clock signal by the division factor selected from the group consisting of 5, 9 and 15 when the first baud rate is 750 Mbaud.

15. The system of claim 10, wherein the sampling circuitry is further configured to:
    generate a decimated number of samples representing at least one data symbol from the one or more encoded data symbols by sampling the one or more encoded data symbols using the divided clock signal,
    wherein the decimated number equals a result of the first baud rate divided by the common factor and then divided by the division factor.

16. The system of claim 15, wherein the sampling circuitry is further configured to:
    configure a first correlation filter based on the number of samples, wherein the first correlation filter has a same number of coefficients as the number of samples; and
    evaluate whether the one or more data samples correspond to an input data bit of one based on the first correlation filter.

17. The system of claim 16, wherein the sampling circuitry is further configured to:
    configure a second correlation filter based on the number of samples, wherein the second correlation filter has the same number of coefficients as the number of samples; and
    evaluate whether the one or more data samples correspond to an input data bit of zero based on the second correlation filter.

18. The system of claim 17, wherein the sampling circuitry is further configured to:
    generate an output data bit based at least in part on a first correlation output from the first correlation filter and a second correlation output from the second correlation filter by comparing a first absolute value of the first correlation output with a second absolute value of the second correlation output;
    determine the output data bit is zero if the second absolute value of the second correlation output is greater than the first absolute value of the first correlation output; and
    determine the output data bit is one if the second absolute value of the second correlation output is no greater than the first absolute value of the first correlation output.

* * * * *